(12) United States Patent
Moon et al.

(10) Patent No.: US 11,818,243 B2
(45) Date of Patent: Nov. 14, 2023

(54) SCENARIO-BASED ENCRYPTION DEVICE AND OPERATING METHOD THEREOF

(71) Applicant: SAMSUNG ELECTRONICS CO., LTD., Suwon-si (KR)

(72) Inventors: Youngsik Moon, Hwaseong-si (KR); Wijik Lee, Suwon-si (KR); Hongrak Son, Anyang-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/343,318

(22) Filed: Jun. 9, 2021

(65) Prior Publication Data
US 2022/0094521 A1 Mar. 24, 2022

(30) Foreign Application Priority Data
Sep. 23, 2020 (KR) .................. 10-2020-0123320

(51) Int. Cl.
*H04L 9/00* (2022.01)
*G06F 21/60* (2013.01)
*H04L 9/08* (2006.01)

(52) U.S. Cl.
CPC ............ *H04L 9/008* (2013.01); *G06F 21/602* (2013.01); *H04L 9/0869* (2013.01)

(58) Field of Classification Search
CPC ..... H04L 9/008; H04L 9/0869; H04L 9/0618; H04L 2209/12; H04L 9/00; H04L 9/08; G06F 21/602; G06F 21/60
See application file for complete search history.

(56) References Cited

U.S. PATENT DOCUMENTS 9,716,590 B2 7/2017 Gentry
10,153,894 B2 12/2018 Laine et al.
(Continued)

FOREIGN PATENT DOCUMENTS

CN 108923907 A 11/2018
KR 101861089 2/2018
(Continued)

OTHER PUBLICATIONS

Gentry et al., "Homomorphic Encryption from Learning with Errors: Conceptually-Simpler, Asymptotically-Faster, Attribute-Based," R. Canetti and J. A. Garay (Eds.): CRYPTO 2013, Part I, LNCS 8042, pp. 75-92 2013.
(Continued)

*Primary Examiner* — Quazi Farooqui
(74) *Attorney, Agent, or Firm* — Fish & Richardson P.C.

(57) ABSTRACT

An encryption device includes: a parameter generating circuit configured to generate an encryption parameter including a number of initial valid bits based on an operation scenario; an encryption circuit configured to generate a cipher text by encrypting a plain text received from the outside, based on the encryption parameter; an operation circuit configured to generate a final cipher text by performing a plurality of operations on the cipher text according to the operation scenario and tag, to the final cipher text, history information of the operations performed on the final cipher text; and a decryption circuit configured to generate a decrypted plain text by decrypting the final cipher text and output a number of reliable bits of the decrypted plain text based on the history information.

20 Claims, 13 Drawing Sheets

(56) References Cited

U.S. PATENT DOCUMENTS

| | | | |
|---|---|---|---|
| 10,491,373 B2 | 11/2019 | Jain et al. | |
| 10,924,262 B2 | 2/2021 | Shim et al. | |
| 2007/0226514 A1* | 9/2007 | Maletsky | H04L 9/3234 |
| | | | 713/186 |
| 2013/0318351 A1* | 11/2013 | Hirano | H04L 9/3073 |
| | | | 713/168 |
| 2013/0329883 A1* | 12/2013 | Tamayo-Rios | H04L 9/008 |
| | | | 380/28 |
| 2014/0312931 A1* | 10/2014 | Mateosky | H03K 19/00346 |
| | | | 326/41 |
| 2019/0097788 A1* | 3/2019 | Howe | G06F 21/602 |
| 2019/0363871 A1 | 11/2019 | Cheon et al. | |
| 2020/0036511 A1 | 1/2020 | Cheon et al. | |
| 2020/0125739 A1* | 4/2020 | Verma | H04L 9/008 |
| 2020/0402073 A1* | 12/2020 | Tang | H04L 63/04 |

FOREIGN PATENT DOCUMENTS

| | | |
|---|---|---|
| KR | 101919940 | 11/2018 |
| KR | 102040106 | 11/2019 |
| KR | 1020200070090 | 6/2020 |
| WO | WO 2016-195552 A1 | 12/2016 |
| WO | WO 2017-079226 A1 | 5/2017 |

OTHER PUBLICATIONS

European Official Communcation Cited in EP Patent Application No. 21188299.8 dated Jan. 14, 2022.

\* cited by examiner

| OP_SNR | |
|---|---|
| Operation | Type |
| OP1 | Multiply |
| OP2 | add |
| ⋮ | ⋮ |
| OPn | approximate |

```
START
  ↓
OBTAIN APPROXIMATE ACCURACY BITS OF
APPROXIMATION OPERATION INCLUDED        — S220
IN OPERATION SCENARIO
  ↓
DETERMINE NUMBER OF INITIAL VALID BITS
TO BE INCLUDED IN CIPHER TEXT, BASED ON  — S240
APPROXIMATE ACCURACY BITS
  ↓
OUTPUT ENCRYPTION PARAMETER             — S260
INCLUDING INITIAL VALID BITS
  ↓
END
```

FIG. 16

| N | uR_bit # |
|---|---|
| 1 | V1 |
| 2 | V2 |
| ⋮ | ⋮ |
| n | Vm |

UNRELIABLE BIT TABLE (18)

SCENARIO-BASED ENCRYPTION DEVICE AND OPERATING METHOD THEREOF

CROSS-REFERENCE TO RELATED APPLICATION

This U.S. nonprovisional patent application is based on and claims the benefit of priority under 35 U.S.C. § 119 to Korean Patent Application No. 10-2020-0123320, filed on Sep. 23, 2020 in the Korean Intellectual Property Office, the disclosure of which is incorporated by reference herein in its entirety.

BACKGROUND

The inventive concept(s) described herein relate to a homomorphic encryption device and an operating method thereof. More particularly, the inventive concept(s) described herein relate to a homomorphic encryption device for generating an encryption parameter based on an operation scenario of a homomorphic operation, and an operating method of the homomorphic encryption device.

Along with the development of communication technology and the vigorous supply of electronic devices, continuous efforts have been made to maintain communication security between electronic devices. Accordingly, encryption/decryption technology has been used in most modern electronic communication environments.

When a message encrypted using encryption technology is delivered to a counterpart, the counterpart decrypts the encrypted message to use the message. In this case, hacking by a third party may occur when the counterpart has temporarily decrypted the message for an operation, and the decrypted message may be easily leaked to the third party.

To solve such problems, research into homomorphic encryption methods has been conducted. Cipher text is the result of encryption performed on plaintext using an encryption algorithm. According to homomorphic encryption being studied, the same result may be obtained when performing an operation on encrypted information in a cipher text state (i.e., without first decrypting the encrypted information), as when performing an operation on preliminary text (plaintext) and then encrypting the operation result. Therefore, various kinds of operations on a cipher text may be performed in a state in which the cipher text is not decrypted.

SUMMARY

The inventive concept(s) described herein provide a homomorphic encryption device for minimizing resources to be wasted in a homomorphic operation and improving a speed of the homomorphic operation and an operating method thereof.

According to an aspect of the present disclosure, an encryption device includes a parameter generating circuit, an encryption circuit, an operation circuit, and a decryption circuit. The parameter generating circuit is configured to generate an encryption parameter including a number of initial valid bits based on an operation scenario. The encryption circuit is configured to generate a cipher text by encrypting a plain text received from the outside, based on the encryption parameter. The operation circuit is configured to generate a final cipher text by performing a plurality of operations on the cipher text according to the operation scenario and to tag, to the final cipher text, history information of the operations performed on the final cipher text. The decryption circuit is configured to generate a decrypted plain text by decrypting the final cipher text and to output a number of reliable bits of the decrypted plain text based on the history information.

According to another aspect of the present disclosure, an operating method of an encryption device includes generating an encryption parameter including a number of initial valid bits based on an operation scenario of a homomorphic operation. The operating method also includes generating a cipher text by encrypting a plain text received from the outside, based on the encryption parameter. The operating method further includes generating a final cipher text by performing a plurality of operations on the cipher text according to the operation scenario, and outputting a decrypted plain text by decrypting the final cipher text.

According to another aspect of the present disclosure, a storage controller includes a parameter generating circuit, and an operation circuit. The parameter generating circuit is configured to generate an encryption parameter including a number of initial valid bits based on an operation scenario of a homomorphic operation and to output the encryption parameter to a host. The operation circuit is configured to receive, from the host, a cipher text encrypted according to the encryption parameter, to generate a final cipher text by performing the homomorphic operation on the cipher text according to the operation scenario, and to output the final cipher text to the host.

BRIEF DESCRIPTION OF THE DRAWINGS

Embodiments of the present disclosure will be more clearly understood from the following detailed description taken in conjunction with the accompanying drawings in which:

FIG. 16 illustrates an unreliable bit table according to an example embodiment of the present disclosure.

DETAILED DESCRIPTION OF THE EMBODIMENTS

Hereinafter, various embodiments of the present disclosure will be described with reference to the accompanying drawings.

Figure 1:
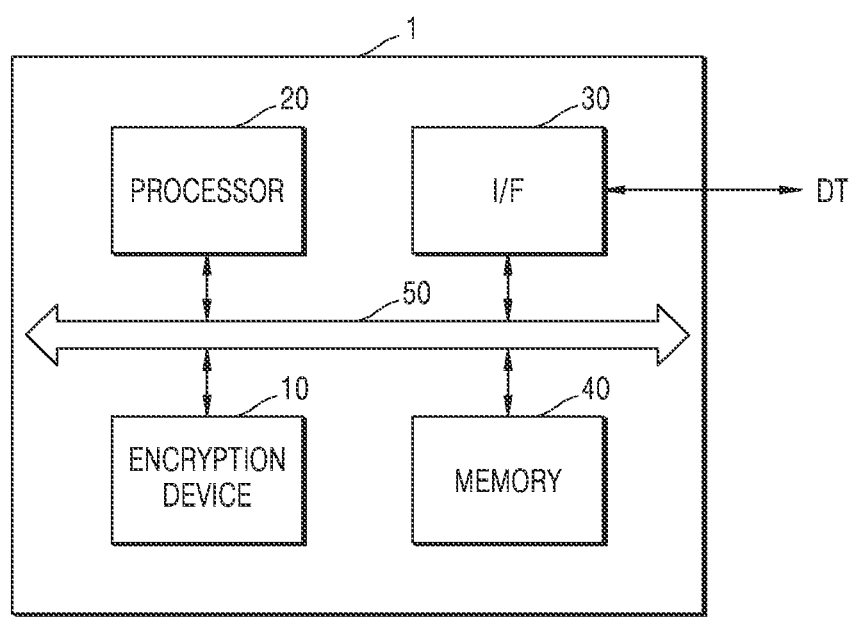
FIG. 1 illustrates a block diagram of an electronic device according to an example embodiment of the present disclosure.

FIG. 1 illustrates a block diagram of an electronic device 1 according to an example embodiment of the present disclosure.

The electronic device 1 may include an encryption device 10, a processor 20, an interface 30, a memory 40, and a bus 50. The components included in the electronic device 1 may communicate with each other via the bus 50. The electronic device 1 may transmit data DT to the outside and receive data DT from the outside via the interface 30. For example, the electronic device 1 may transmit and receive the data DT to and from a smart card, a memory card, or another device.

The electronic device 1 may be implemented by or included in various electronic devices. For example, the electronic device 1 may include a drone, a robot device, an advanced driver assistance system (ADAS), a smart TV, a mobile device such as a smartphone, a medical appliance, an image display device, a metering device, an Internet of Things (IoT) device, or the like.

The encryption device 10 may encrypt and/or decrypt the data DT received from the outside of the electronic device 1. The encryption device 10 may maintain the security of the data DT by performing an encryption operation on the data DT based on an encryption algorithm. The encryption algorithm may be an algorithm for generating encrypted data by using, for example, an encryption key. In many embodiments described herein, the encryption algorithm may be a homomorphic encryption algorithm.

The memory 40 may store instructions and the data DT. The processor 20 may execute the instructions to process the data DT in accordance with the instructions. When executed by the processor 20, the instructions may cause the electronic device 1 to perform or otherwise implement aspects of methods described herein.

The processor 20 may transmit the data DT to the outside of the electronic device 1 through the interface 30 and may receive the data DT from the outside of the electronic device 1 through the interface 30. The processor 20 may execute a task and store the execution result in the memory 40. For example, the processor 20 may include a plurality of cores.

The memory 40 may store various kinds of data needed for an operation of the processor 20. The memory 40 may be implemented by, for example, dynamic random access memory (DRAM), mobile DRAM, static RAM (SRAM), phase change RAM (PRAM), ferroelectric RAM (FRAM), resistive RAM and/or magnetic RAM (MRAM).

In some embodiments, the encryption device 10 may generate a cipher text by encrypting a plain text according to a homomorphic encryption scheme. The encryption device 10 may process the cipher text by performing an operation on the cipher text. The operation may include an addition operation, a multiplication operation, or an approximation operation.

The cipher text may include a preliminary text, a message, and an error according to the property of a homomorphic encryption scheme. The message may include valid bits without an error. Every time a multiplication operation on the cipher text is performed, a length of the preliminary text may decrease. Therefore, the number of multiplication operations that may be performed on the cipher text is proportional to the length of the preliminary text, such that more preliminary text allows for more multiplication operations that may be performed on the cipher text. However, when the length of the preliminary text is too long, an operation time may be long, and the performance of the encryption device 10 may be wasted.

As described below with reference to FIG. 5, every time a multiplication operation on the cipher text is performed, a length of the error may increase, and the number of valid bits may decrease. Therefore, the more initial valid bits $P_i$ included in the cipher text, the more final valid bits $P_f$ included in the cipher text after an operation ends. However, when the number of final valid bits $P_f$ is excessively more than a required reference, the operation performance of the encryption device 10 may be unnecessarily wasted.

Therefore, the encryption device 10 according to some example embodiments of the present disclosure may generate an encryption parameter based on an operation scenario to be performed for the cipher text. The operation scenario may be a scenario of a homomorphic operation determined in advance and to be performed on the cipher text, and may include a plurality of operations. The encryption parameter may be used to determine a length of the preliminary text, the message, and/or the error of the cipher text. That is, the encryption device 10 may generate the cipher text based on the operation scenario, thereby minimizing operation performance to be wasted.

Figure 2:
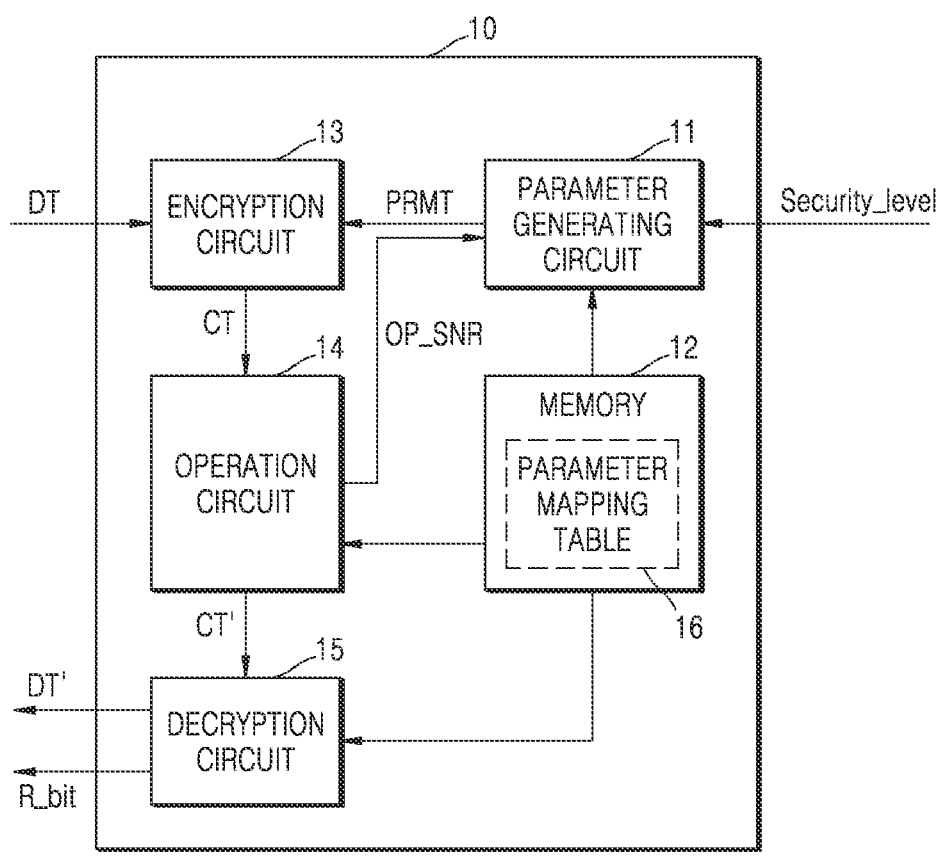
FIG. 2 illustrates a block diagram of an encryption device according to an example embodiment of the present disclosure.

FIG. 2 illustrates a block diagram of the encryption device 10 according to an example embodiment of the present disclosure.

Referring to FIG. 2, the encryption device 10 may include a parameter generating circuit 11, a memory 12, an encryption circuit 13, an operation circuit 14, and a decryption circuit 15.

Before proceeding, it should be clear that FIGs. herein including FIG. 2 show and reference circuitry with labels such as "circuit". As is traditional in the field of the inventive concept(s) described herein, examples may be described and illustrated in terms of circuits and blocks which carry out a described function or functions. These circuits and blocks, which may be referred to herein as a parameter generating circuit, an encryption circuit, an operation circuit, a decryption circuit, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a circuit or block may be implemented by dedicated hardware, or by a processor (e.g., one or more programmed microprocessors and associated circuitry), or by a combination of dedicated hardware to perform some functions of the circuit or block and a processor to perform other functions of the circuit or block. Each circuit or block of the examples may be physically separated into two or more interacting and discrete circuits or blocks without departing from the scope of the present disclosure. Likewise, the circuits and blocks of the examples may be physically combined into more complex circuits and blocks without departing from the scope of the present disclosure.

The parameter generating circuit 11 may obtain an operation scenario OP_SNR from the operation circuit 14. The parameter generating circuit 11 may determine a portion of an encryption parameter PRMT, e.g., the number of initial valid bits to be included in a cipher text, based on the operation scenario OP_SNR. For example, the parameter generating circuit 11 may determine the number of initial valid bits with reference to a parameter mapping table 16 stored in the memory 12.

The parameter generating circuit 11 may receive a security_level security_level from the outside. The security level security_level may have a discrete value indicating a security grade of a cipher text. The parameter generating circuit 11 may determine a portion of the encryption parameter PRMT, e.g., a total cipher text length and/or an error length, based on the security level security_level. A relationship between a security level and an encryption parameter will be described below with reference to FIG. 3 and FIG. 4. The encryption parameter PRMT may include a total cipher text length, a preliminary text length, a message length, and/or an error length. An operation of the parameter generating circuit 11 will be described below in detail with reference to FIG. 3, FIG. 4, FIG. 5, FIG. 7, FIG. 8, and FIG. 11.

The encryption circuit 13 may receive the data DT from the outside and generate a cipher text CT by performing homomorphic encryption on the data DT according to the encryption parameter PRMT obtained from the parameter generating circuit 11. That is, the encryption circuit 13 may generate the cipher text CT satisfying the encryption parameter PRMT, i.e., a total cipher text length, a preliminary text length, a message length, and/or an error length. The data DT may be referred to as a plain text. A process of encrypting a plain text by using the encryption parameter PRMT will be described below with reference to FIG. 3.

The operation circuit 14 may perform an operation on the cipher text CT and output a final cipher text CT'. In the specification, the cipher text CT input to the operation circuit 14 may be referred to as an initial cipher text CT. The operation may include an addition operation, a multiplication operation, or an approximation operation. In the addition operation, the number of valid bits and/or an error length of a cipher text may be maintained. In the multiplication operation, a preliminary text length and the number of valid bits may decrease, and an error length may increase. A multiplication operation process is described below with reference to FIG. 5. The approximation operation may be an operation of approximating a true value of a transcendental function of which an input is the cipher text CT, by using an approximating polynomial of the transcendental function. An error may occur between the true value and an approximate value obtained by the approximation operation. A part of bits indicating the approximate value, which is the same as bits indicating the true value, may be referred to as approximate accuracy bits $P_{aprx}$. An approximation operation process will be described below with reference to FIG. 9, FIG. 10, and FIG. 12.

The operation circuit 14 may be configured to tag, to the cipher text CT, history information of operations performed on the cipher text while the plurality of operations included in the operation scenario are performed on the cipher text. Accordingly, the operation circuit 14 may tag history information of performed operations to the cipher text CT. For example, the operation circuit 14 may tag, to the cipher text CT, the number of multiplication operations performed on the cipher text CT. The operation circuit 14 may tag the number of approximate valid bits to the cipher text CT. A process, performed by the operation circuit 14, of tagging history information will be described below with reference to FIG. 13 and FIG. 14.

The decryption circuit 15 may receive the final cipher text CT' and output decrypted data DY. According to the property of a homomorphic decryption scheme, the decrypted data DT' may include unreliable bits unlike the data DT. The decryption circuit 15 according to some example embodiments of the present disclosure may generate information about reliable bits R_bit in the decrypted data DT' based on the history information tagged to the final cipher text CT'. The decryption circuit 15 may output the information about the reliable bits R_bit together with the decrypted data DT'. A process of outputting reliable bit information will be described below with reference to FIG. 15 and FIG. 16.

Figure 3:
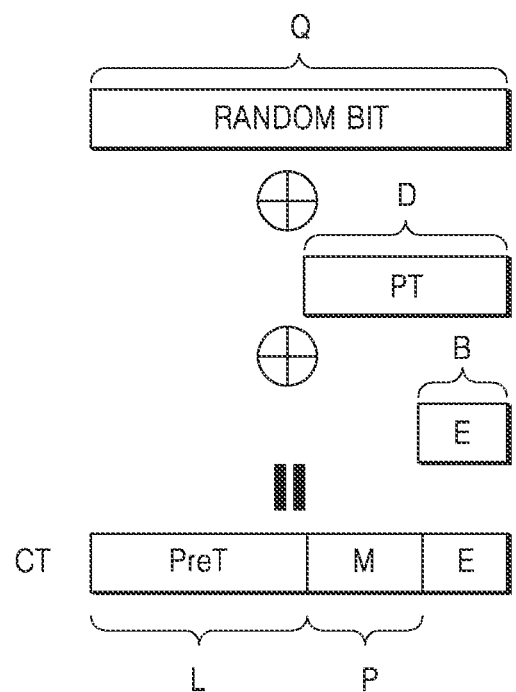
FIG. 3 illustrates a homomorphic encryption process according to an example embodiment of the present disclosure.
Figure 4:
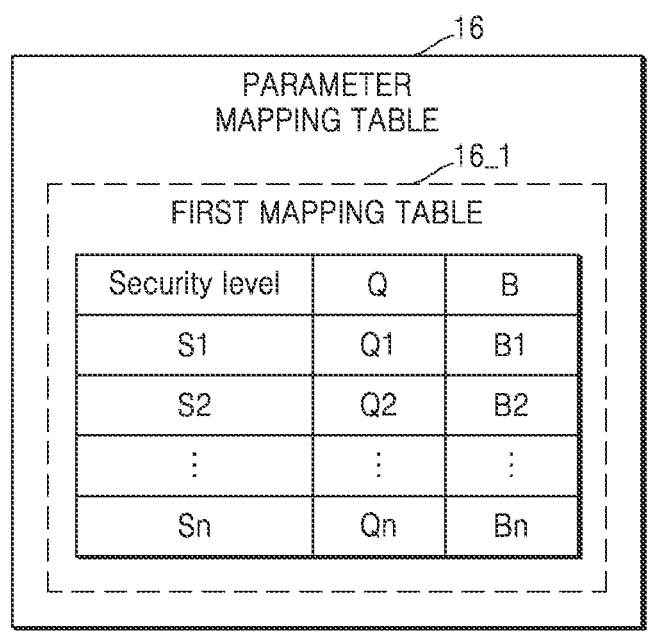
FIG. 4 illustrates a security parameter mapping table according to an example embodiment of the present disclosure.

FIG. 3 illustrates a homomorphic encryption process according to an example embodiment of the present disclosure. FIG. 4 illustrates a security parameter mapping table according to an example embodiment of the present disclosure.

Referring to FIG. 3, an encryption parameter may include a total cipher text length Q, a plain text length D, an error bit having an error length B, a length L of a preliminary text PreT, and/or a valid bit length P. The encryption circuit 13 may generate the cipher text CT by adding random bits having the length Q, a plain text PT having the length D, and an error E having the error length B. The error length B may refer to a number of error bits included in the cipher text. The cipher text CT may include the preliminary text PreT, a message M, and the error E. In the specification, the message M may be referred to as valid bits. The length of the preliminary text PreT may be L, and the length of the valid bits may be P. The length P of the valid bits may correspond to a difference between the length D of the plain text PT and the error length B. The length P of the valid bits may correspond to a difference between the number of bits in the length D and the number of error bits in the error length B.

The parameter generating circuit 11 of FIG. 2 may determine the total length Q and the error length B of the cipher text CT based on a security level received from the outside.

Referring to FIG. 4, the parameter mapping table 16 may include a first mapping table 16_1. The first mapping table 16_1 may include information about a relationship among the security level, the total length Q, and the error length B. For example, when the security level is S1, the total length Q may be Q1, and the error length B may be B1, when the security level is S2, the total length Q may be Q2, and the error length B may be B2, and when the security level is Sn, the total length Q may be Qn, and the error length B may be Bn. However, the first mapping table 16_1 is not limited thereto, and the higher the security level, the larger the total length Q or the error length B. For example, when S2 is greater than S1, Q2 may be greater than Q1, or B2 may be greater than B1. When the total length Q or the error length B of a cipher text increases, it may be more difficult to decrypt the cipher text, and thus, a plain text may be more safely protected. The relationship among the security level, the total length Q, and the error length B included in the first mapping table 16_1 may be determined in advance and stored in the memory 12.

Figure 5:
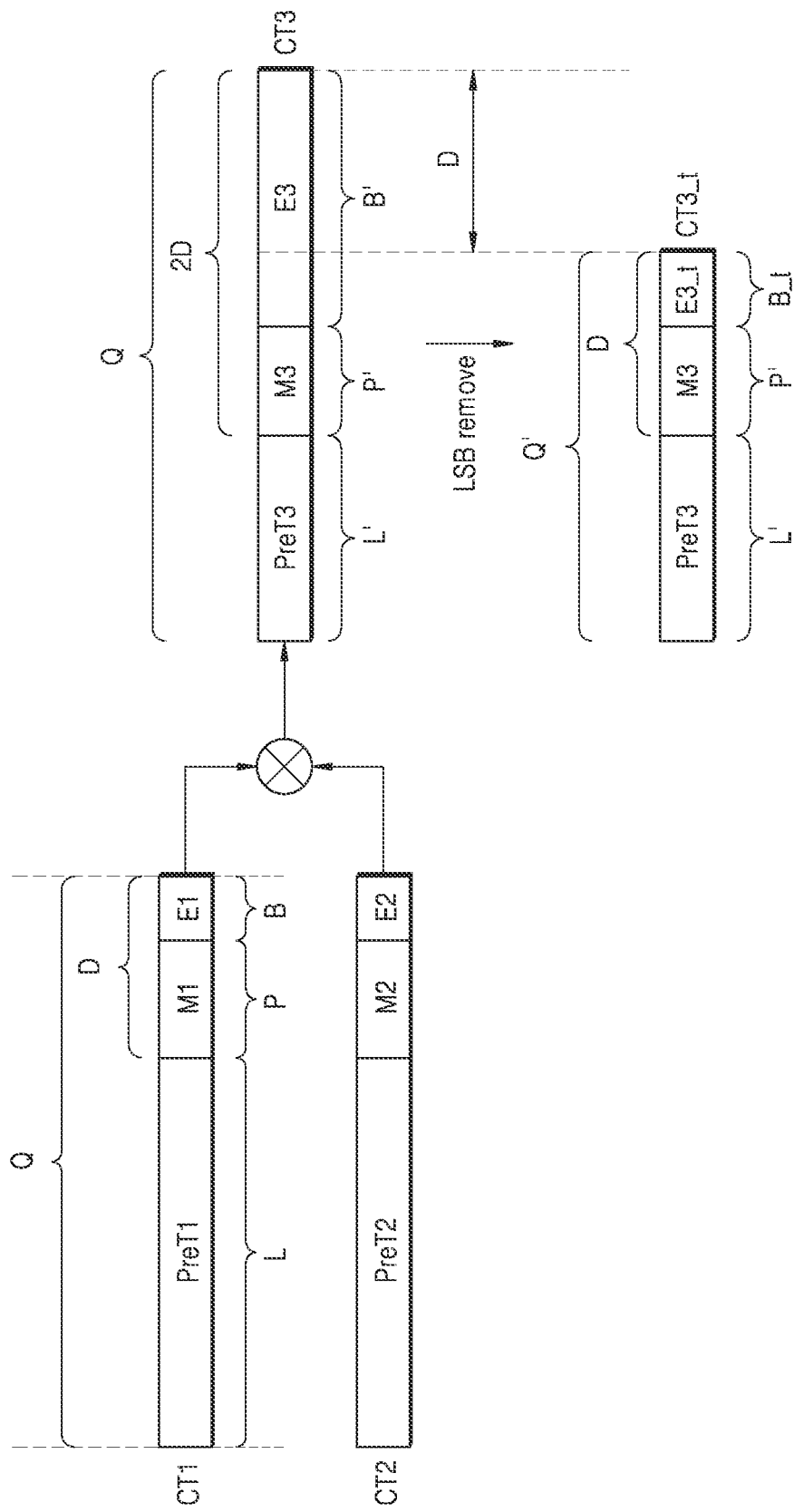
FIG. 5 illustrates a multiplication operation on homomorphic cipher texts, according to an example embodiment of the present disclosure.

FIG. 5 illustrates a multiplication operation on homomorphic cipher texts, according to an example embodiment of the present disclosure. The operation circuit 14 may perform a multiplication operation on a first cipher text CT1 and a second cipher text CT2. Herein, the first cipher text CT1 may include a first preliminary text PreT1, a first message M1, and a first error E1. A total length of the first cipher text CT1 may be Q, and a length of a plain text thereof may be D. In addition, a length of the first preliminary text PreT1 may be L, a length of the first message M1 indicating valid bits of the plain text may be P, and a length of the first error E1 may be B. Likewise, the second cipher text CT2 may include a second preliminary text PreT2, a second message M2, and a second error E2. A total length of the second cipher text CT2 may be Q, and a length of a plain text thereof may be D. In addition, a length of the second preliminary text PreT2 may be L, a length of the second message M2 indicating valid bits of the plain text may be P, and a length of the second error E2 may be B.

The operation circuit 14 may generate a third cipher text CT3 by performing a multiplication operation on the first cipher text CT1 and the second cipher text CT2. The third cipher text CT3 may include a third preliminary text PreT3, a third message M3, and a third error E3. A total length of the third cipher text CT3 may be Q, a length of the third preliminary text PreT3 may be L', a length of the third message M3 may be P', and a length of the third error E3 may be B'. According to the property of a multiplication operation on homomorphic cipher texts, the length L' of the third preliminary text PreT3 may be less than L, the length P' of the third message M3 may be less than P, and the error length B' of the third error E3 may be greater than the error length B.

When an error in a cipher text is excessively long, the reliability of the cipher text may be degraded. Therefore, the operation circuit 14 may obtain a modified third error $E3\_t$ by removing some of least significant bits (LSBs) of the third error E3 in the third cipher text CT3. The number of removed LSBs may be set to D and may be a number of removal bits to be removed from the cipher text after the plurality of operations are performed. Therefore, an error length B_t of the modified third error $E3\_t$ may be less than the error length B'. However, according to the property of a multiplication operation, the error length B_t of the modified third error $E3\_t$ may be greater than the error length B of the first error E1, and thus, a length of an error included in a cipher text may be large as a multiplication operation is repeated. Because the LSBs of the length D are removed from the third cipher text CT3 of the length Q, a length Q' of a modified third cipher text $CT3\_t$ may be less than Q.

As a result, as a multiplication operation is repeated, a total length of a cipher text and a length of valid bits included in the cipher text may be small, and a length of an error may be large.

Figures 6, 7:
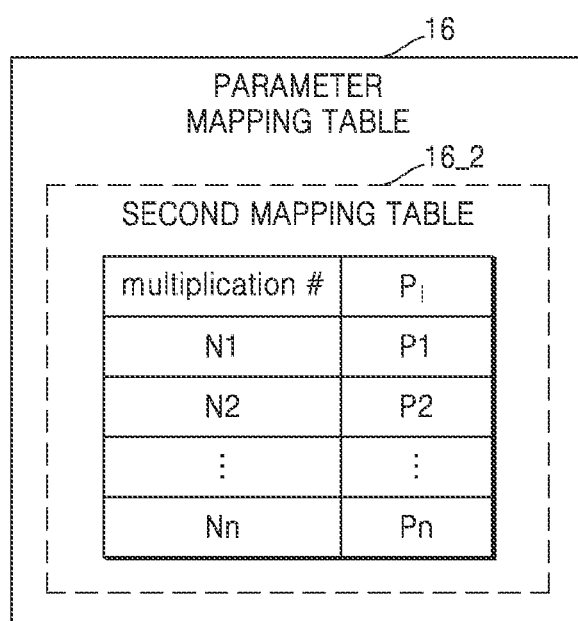
FIG. 6 illustrates an operation scenario table according to an example embodiment of the present disclosure.
FIG. 7 illustrates a second mapping table according to an example embodiment of the present disclosure.

FIG. 6 illustrates an operation scenario table according to an example embodiment of the present disclosure. FIG. 7 illustrates a second mapping table 16_2 according to an example embodiment of the present disclosure.

Referring to FIG. 6, the operation scenario OP_SNR may include a plurality of operations OP1 to OPn. Each of the plurality of operations OP1 to OPn may be one of an addition operation, a multiplication operation, and/or an approximation operation. After a multiplication operation, a length of a cipher text may be changed as described above with reference to FIG. 5. An approximation operation may include at least one of an addition operation and a multiplication operation. An approximation operation is described below with reference to FIG. 9.

The parameter generating circuit 11 according to some example embodiments of the present disclosure may generate the encryption parameter PRMT based on the number of multiplication operations included in the operation scenario OP_SNR. Particularly, the parameter generating circuit 11 may count a number N of multiplication operations included in the operation scenario OP_SNR. The parameter generating circuit 11 may determine the length D of a plain text and a length of initial valid bits $P_i$ according to Equation 1 and Equation 2 based on the number N of multiplication operations. The initial valid bits $P_i$ may be valid bits included in a cipher text generated by the encryption circuit 13. Equation 1 and Equation 2 are provided below:

$$Q = D \cdot N \qquad \text{Equation 1}$$

$$P_i = D - B \qquad \text{Equation 2}$$

Referring to FIG. 7, for example, the parameter generating circuit 11 may determine the length of initial valid bits $P_i$ with reference to the second mapping table 16_2. The second mapping table 16_2 may be included in the parameter mapping table 16. The second mapping table 16_2 may indicate a relationship between the number of multiplication operations and the number of initial valid bits $P_i$. The second mapping table 16_2 may include values calculated according to Equations 1 and 2 and may be stored in advance in the memory 12.

The parameter generating circuit 11 according to some example embodiments of the present disclosure may perform encryption optimized to a homomorphic operation by adjusting the number of initial valid bits to be included in a cipher text according to an operation scenario. The adjustment may be made by referring to the second mapping table 16_2.

Figure 8:
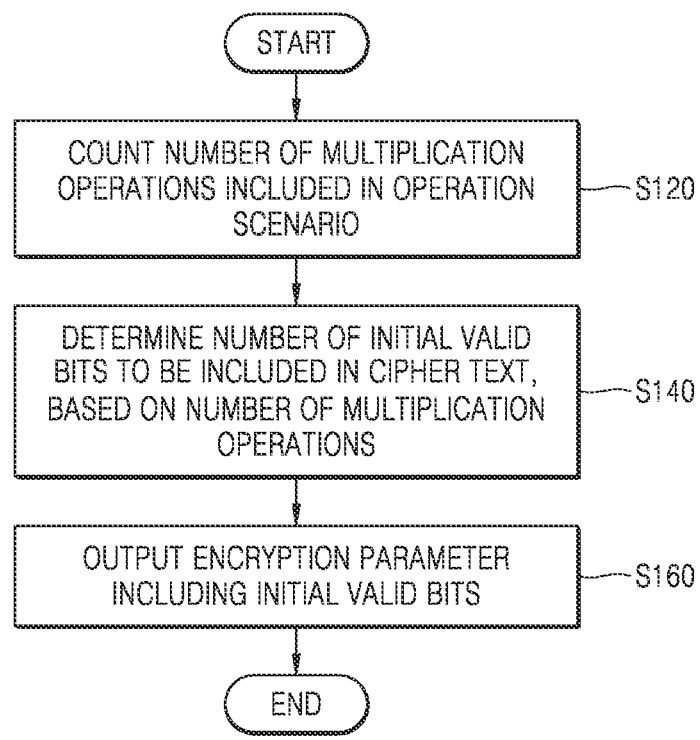
FIG. 8 illustrates a flowchart of a method of generating an encryption parameter, according to an example embodiment of the present disclosure.

FIG. 8 illustrates a flowchart of a method of generating an encryption parameter, according to an example embodiment of the present disclosure.

Referring to FIG. 8, the parameter generating circuit 11 may perform operations S120, S140, and S160.

In operation S120, the parameter generating circuit 11 may receive the operation scenario OP_SNR from the operation circuit 14 and count the number of multiplication operations included in the operation scenario OP_SNR.

In operation S140, the parameter generating circuit 11 may determine the number of initial valid bits $P_i$ to be included in a cipher text, based on the number of multiplication operations. For example, the parameter generating circuit 11 may determine the number of initial valid bits $P_i$ based on Equations 1 and 2. As another example, the parameter generating circuit 11 may select the number of initial valid bits $P_i$ corresponding to the number of multiplication operations counted with reference to the second mapping table 16_2.

In operation S160, the parameter generating circuit 11 may transmit or otherwise output, to the encryption circuit 13, an encryption parameter including the number of initial valid bits $P_i$.

The method of generating an encryption parameter, according to some example embodiments of the present disclosure, may generate an encryption parameter based on an operation scenario. That is, a length of a cipher text generated based on the encryption parameter may be optimized to the operation scenario, and thus, the performance of a homomorphic operation may be improved.

Figure 9:
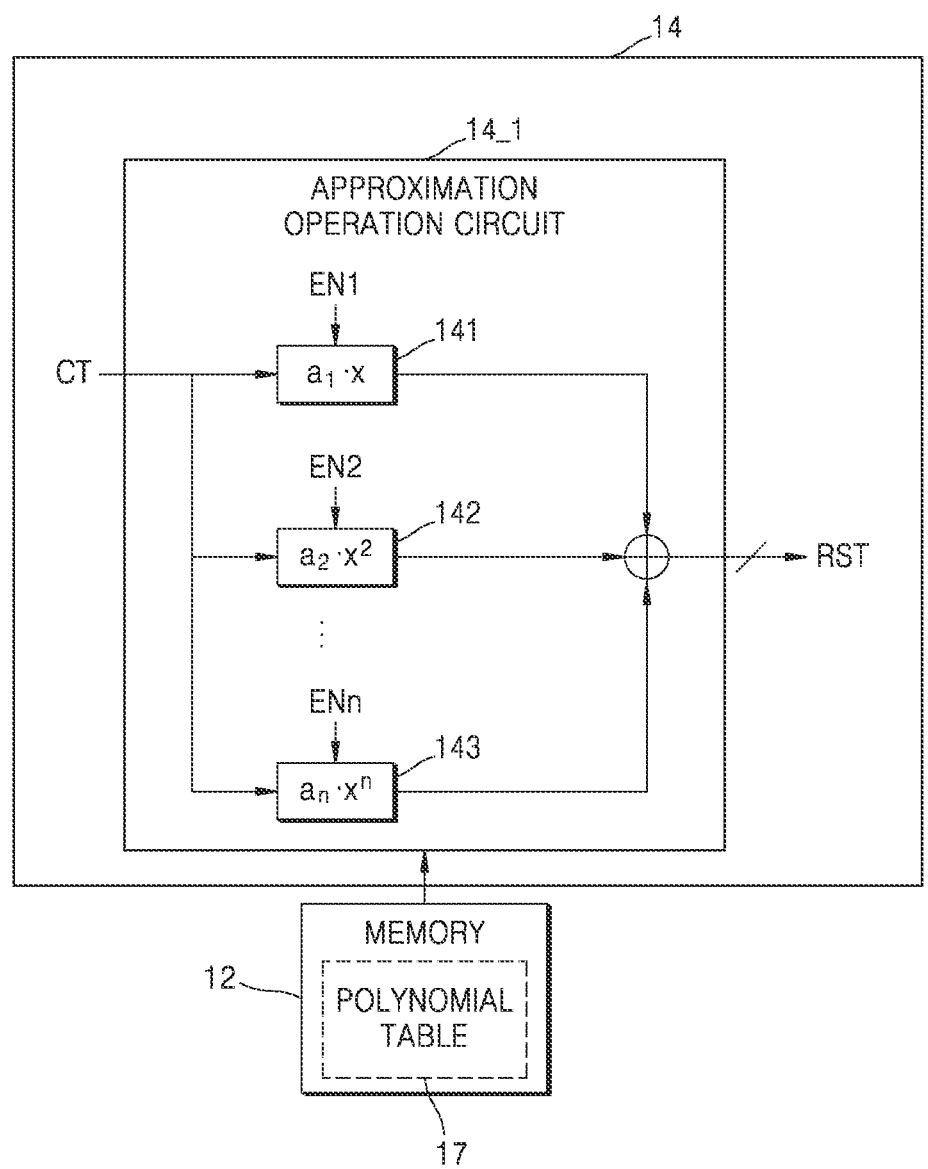
FIG. 9 illustrates an approximation operation according to an example embodiment of the present disclosure.
Figures 10, 11:
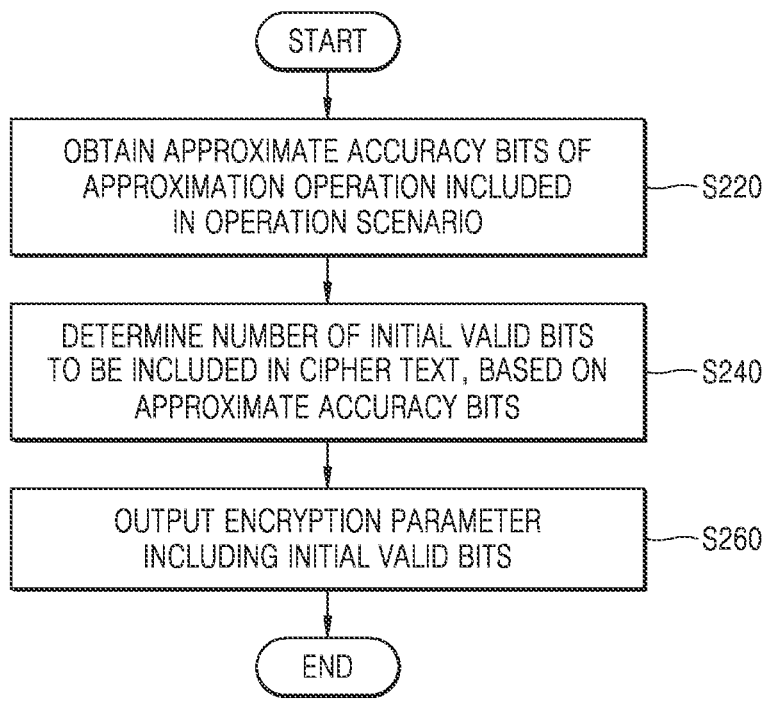
FIG. 10 illustrates an approximating polynomial highest order table according to an example embodiment of the present disclosure.
FIG. 11 illustrates a flowchart of a method of generating a parameter, according to an example embodiment of the present disclosure.

FIG. 9 illustrates an approximation operation according to an example embodiment of the present disclosure. FIG. 10 illustrates an approximating polynomial highest order table according to an example embodiment of the present disclosure.

Referring to FIG. 9, the operation circuit 14 may include an approximation operation circuit 14_1 configured to perform an approximation operation through a polynomial having at least one term. The approximation operation circuit 14_1 may calculate an approximating polynomial of a transcendental function such as a trigonometric function, an exponential function, a logarithmic function, or a step function. That is, an approximation operation may include at least one of an addition operation and a multiplication operation. The approximation operation circuit 14_1 may calculate an approximate value RST of a transcendental function f(x) having the cipher text CT as an input, according to Equation 4:

$$f(x) \cong \sum_{k=0}^{M} a_k \cdot x^k \qquad \text{Equation 4}$$

where $a_k$ may be a coefficient determined in advance. The approximation operation circuit 14_1 may include a plurality of circuits, e.g., first circuit 141, second circuit 142 to nth circuit 143, configured to calculate a value by inputting the cipher text CT to an approximating polynomial. The first circuit 141, second circuit 142 to nth circuit 143 may calculate values by inputting the cipher text CT to first- to nth-order terms, respectively.

The approximation operation circuit 14_1 may activate the first circuit 141, second circuit 142 to nth circuit 143 through control signals EN1, EN2, and ENn, respectively. That is, the approximation operation circuit 14_1 may determine the highest order of the approximating polynomial through the control signals EN1, EN2, and ENn. For example, when only the first circuit 141 and the second circuit 142 are activated, the highest order of the approximating polynomial may be 2, and when all of the first circuit 141, second circuit 142 to nth circuit 143 are activated, the highest order of the approximating polynomial may be n.

As a highest order M of the approximating polynomial increases towards n, the approximate value RST becomes closer to a true value, and thus, the accuracy of an approximation operation may be improved. In other words, as the highest order M of the approximating polynomial increases, the number of accuracy bits of the approximate value RST may increase. In the specification, bits indicating the accuracy of an approximation operation may be represented by approximate accuracy bits $P_{aprx}$.

Reliable valid bits in a cipher text may be determined by considering the length P of valid bits determined by repeating a multiplication operation, and the approximate accuracy bits $P_{aprx}$.

For example, when the number of approximate accuracy bits $P_{aprx}$ is less than the number of valid bits by a multiplication operation, bits obtained by subtracting the number of approximate accuracy bits $P_{aprx}$ from the number of valid bits correspond to an error. That is, after an approximation operation, a portion of the valid bits may lose reliability. As a result, a multiplication operation may be performed on even a portion of the valid bits of which the reliability is to be lost by an approximation operation, and thus, operation performance may be wasted.

Otherwise, when the number of valid bits is less than the number of approximate accuracy bits $P_{aprx}$, it may be understood that the accuracy of an approximation operation is unnecessarily precise. That is, even bits of which the reliability is to be lost by a multiplication operation may be included in the approximate accuracy bits $P_{aprx}$, and thus, the performance of an approximation operation may be wasted.

As a result, when the approximate accuracy bits $P_{aprx}$ have the same number of bits as the final valid bits $P_f$, the best operation performance may be provided. The final valid bits $P_f$ may be valid bits expected to be included in a cipher text when multiplication operations included in an operation scenario are performed. The number of the final valid bits $P_f$ may be calculated by Equation 5:

$$P_f = P_i - \log_2 N \qquad \text{Equation 5}$$

where N denotes the number of multiplication operations included in an operation scenario. The parameter generating circuit 11 according to some example embodiments of the present disclosure may determine the number of initial valid bits $P_i$ to be included in a cipher text, so that the approximate accuracy bits $P_{aprx}$ have the same number of bits as the final valid bits $P_f$. Particularly, the final valid bits $P_f$ having the same number of bits as the approximate accuracy bits $P_{aprx}$ may be determined. Thereafter, the number of initial valid bits $P_i$ may be determined with reference to Equation 5.

The encryption device 10 according to some example embodiments of the present disclosure may determine the initial valid bits $P_i$ by considering the approximate accuracy bits $P_{aprx}$, thereby minimizing resources to be wasted in a multiplication operation.

In another embodiment, the approximation operation circuit 14_1 may control the control signals EN1, EN2, and ENn so that the final valid bits $P_f$ have the same number of bits as the approximate accuracy bits $P_{aprx}$. The approximation operation circuit 14_1 may refer to a polynomial table 17 stored in the memory 12 to control the control signals EN1, EN2, and ENn. Referring to FIG. 10, the polynomial table 17 may indicate a relationship between the highest order M of an approximating polynomial and the approximate accuracy bits $P_{aprx}$. The approximation operation circuit 14_1 may search for the approximate accuracy bits $P_{aprx}$, which has the same number of bits as the final valid bits $P_f$, with reference to the polynomial table 17. In addition, the approximation operation circuit 14_1 may determine a highest-order term corresponding to the retrieved approximate accuracy bits $P_{aprx}$ with reference to the polynomial table 17. The approximation operation circuit 14_1 may control the control signals EN1, EN2, and ENn according to the determined highest-order term.

The encryption device 10 according to some example embodiments of the present disclosure may determine the number of the approximate accuracy bits $P_{aprx}$ by considering the final valid bits $P_f$, thereby minimizing resources to be wasted in an approximation operation.

FIG. 11 illustrates a flowchart of a method of generating a parameter, according to an example embodiment of the present disclosure.

Referring to FIG. 11, the parameter generating circuit 11 may perform operations S220, S240, and S260.

In operation S220, the parameter generating circuit 11 may obtain the approximate accuracy bits $P_{aprx}$ by an approximation operation included in an operation scenario. The approximate accuracy bits $P_{aprx}$ may be a number of bits indicating a true value among bits indicating an approximate value obtained by using an approximating polynomial. As the highest order of the approximating polynomial increases, the number of approximate accuracy bits $P_{aprx}$ may increase.

In operation S240, the parameter generating circuit 11 may determine the number of initial valid bits $P_i$ to be included in a cipher text, based on the approximate accuracy bits $P_{aprx}$. Because the best operation performance may be provided when the approximate accuracy bits $P_{aprx}$ have the same number of bits as the final valid bits $P_f$, the number of initial valid bits $P_i$ to be included in the cipher text may be determined so that the approximate accuracy bits $P_{aprx}$ have the same number of bits as the final valid bits $P_f$. Particularly, the parameter generating circuit 11 may determine the final valid bits $P_f$ having the same number of bits as the approximate accuracy bits $P_{aprx}$. The parameter generating circuit 11 may determine the number of initial valid bits $P_i$ with reference to the determined final valid bits $P_f$ and Equation 5.

In operation S260, the parameter generating circuit 11 may transmit or otherwise output, to the encryption circuit 13, an encryption parameter including the number of initial valid bits $P_i$.

The method of generating a parameter, according to some example embodiments of the present disclosure, may determine the initial valid bits $P_i$ so that the approximate accuracy bits $P_{aprx}$ have the same number of bits as the final valid bits $P_f$, thereby preventing waste of time to be taken for an operation.

Figure 12:
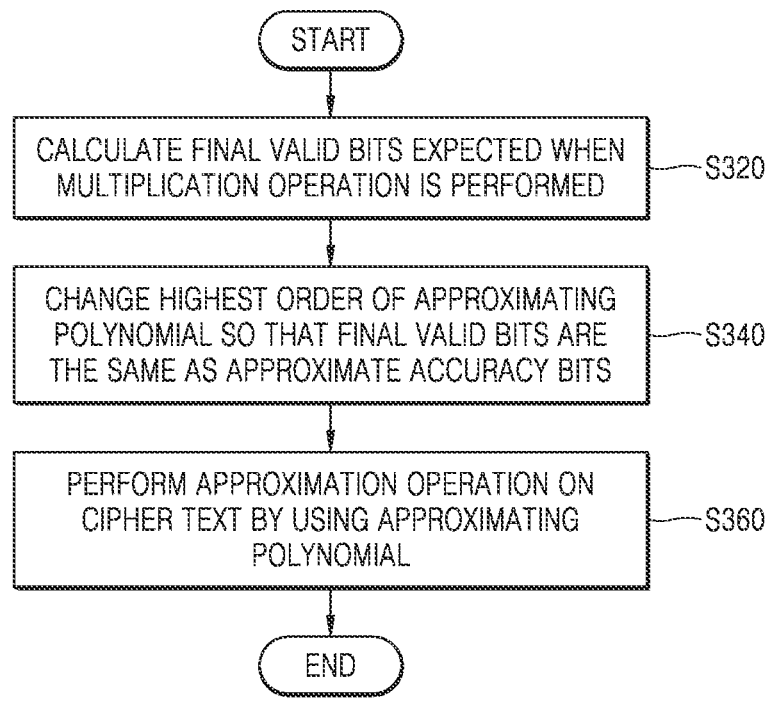
FIG. 12 illustrates a flowchart of an approximation operation method according to an example embodiment of the present disclosure.

FIG. 12 illustrates a flowchart of an approximation operation method according to an example embodiment of the present disclosure.

Referring to FIG. 12, the approximation operation circuit 14_1 may perform operations S320, S340, and S360.

In operation S320, the approximation operation circuit 14_1 may calculate the number of final valid bits $P_f$, which is expected when a multiplication operation included in an operation scenario is performed. The approximation operation circuit 14_1 may count the number of multiplication operations included in the operation scenario OP_SNR and calculate the number of final valid bits $P_f$ according to Equation 5. Herein, the number of final valid bits $P_f$ may be determined in advance by the parameter generating circuit 11.

In operation S340, the approximation operation circuit 14_1 may determine the highest order of an approximating polynomial so that the number of final valid bits $P_f$ is the same as the number of approximate accuracy bits $P_{aprx}$. For example, the approximation operation circuit 14_1 may search for the approximate accuracy bits $P_{aprx}$ having the same number as the number of final valid bits $P_f$, with reference to the polynomial table 17. The approximation operation circuit 14_1 may determine a highest-order term corresponding to the number of retrieved approximate accuracy bits $P_{aprx}$ with reference to the polynomial table 17. The approximation operation circuit 14_1 may activate the plurality of circuits, that is, the first circuit 141, second circuit 142 to nth circuit 143, respectively corresponding to terms of the approximating polynomial according to the determined highest-order term.

In operation S360, the approximation operation circuit 14_1 may perform an approximation operation on a cipher text by using the approximating polynomial having the determined highest order. The approximating polynomial may be an approximating polynomial of a transcendental function such as a trigonometric function, an exponential function, a logarithmic function, or a step function.

The approximation operation method according to some example embodiments of the present disclosure may determine the highest order of an approximating polynomial so that the final valid bits $P_f$ have the same number of bits as the approximate accuracy bits $P_{aprx}$, thereby preventing waste of time to be taken for an approximation operation.

Figure 13:
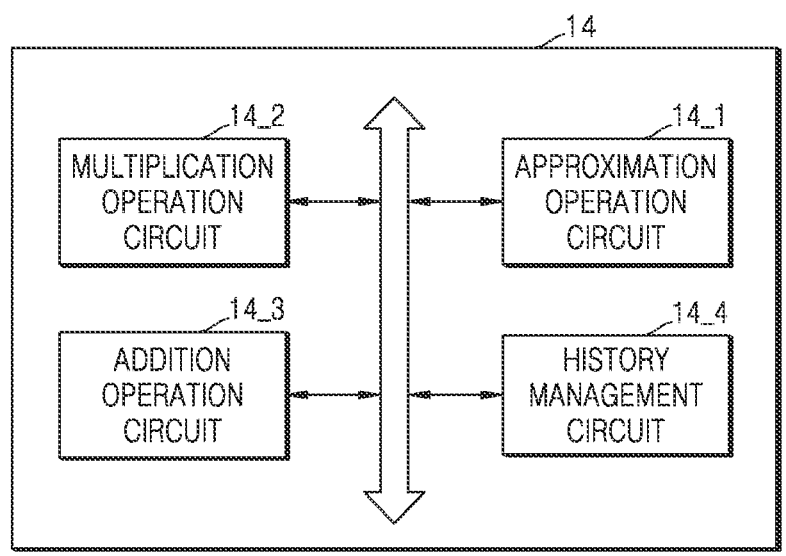
FIG. 13 illustrates a block diagram of an operation circuit according to an example embodiment of the present disclosure.
Figure 14:
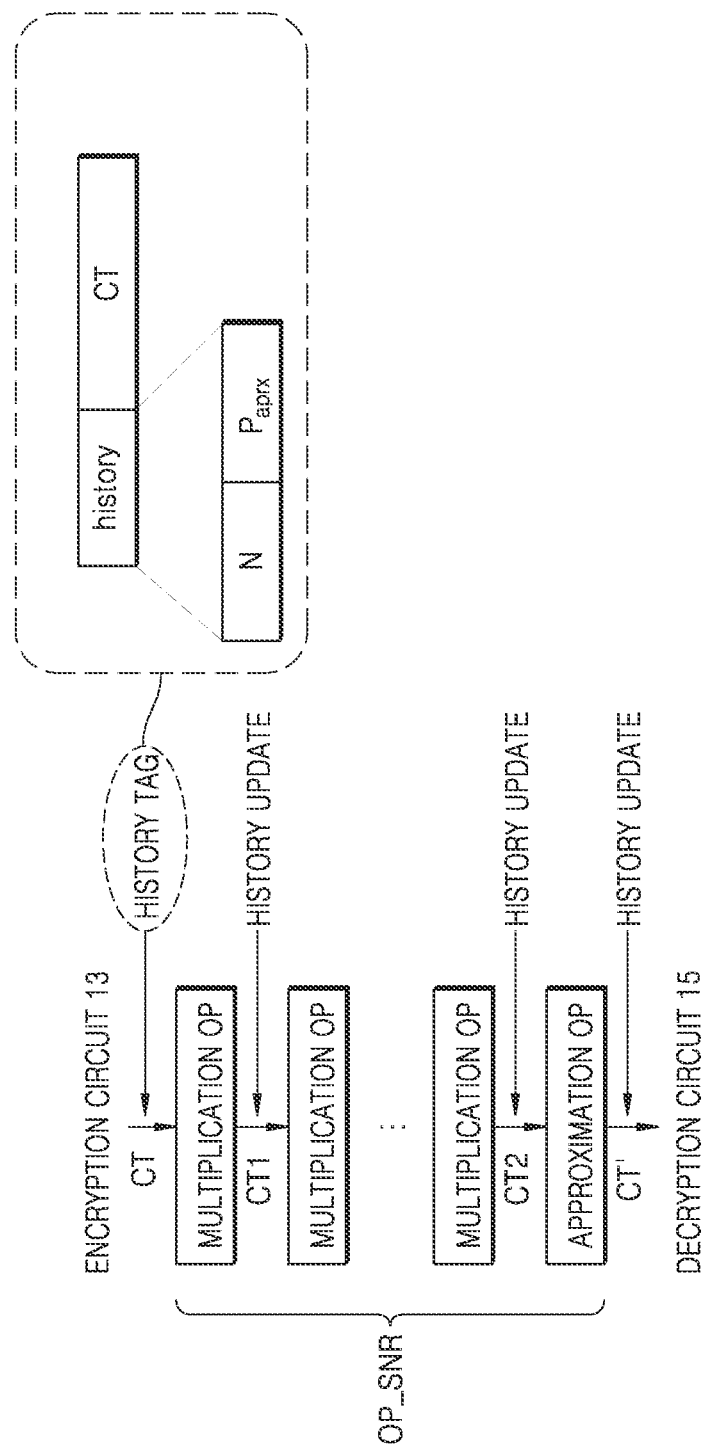
FIG. 14 illustrates a history information management process according to an example embodiment of the present disclosure.

FIG. 13 illustrates a block diagram of the operation circuit 14 according to an example embodiment of the present disclosure. FIG. 14 illustrates a history information management process according to an example embodiment of the present disclosure.

Referring to FIG. 13, the operation circuit 14 may include the approximation operation circuit 14_1, a multiplication operation circuit 14_2, an addition operation circuit 14_3, and a history management circuit 14_4. The approximation operation circuit 14_1 in FIG. 13 may be the same as the approximation operation circuit 14_1 of FIG. 9.

The history management circuit 14_4 may tag history information to a cipher text corresponding to an operation result of the operation circuits, that is, the approximation operation circuit 14_1, the multiplication operation circuit 14_2, and the addition operation circuit 14_3, and manage the history information. The history information may include the number N of multiplication operations performed on the cipher text or the approximate accuracy bits $P_{aprx}$ of an approximation operation.

The history management circuit 14_4 may increase the number of multiplication operations tagged to the cipher text every time the multiplication operation circuit 14_2 performs a multiplication operation on the cipher text. The history management circuit 14_4 may reflect, on the history information, the approximate accuracy bits $P_{aprx}$ of an approximation operation performed on the cipher text by the approximation operation circuit 14_1. For example, referring to FIG. 9, the history management circuit 14_4 may identify the highest order of an approximating polynomial based on states of the control signals EN1, EN2, and ENn of the approximation operation circuit 14_1. In addition, the history management circuit 14_4 may reflect, on the history information, the approximate accuracy bits $P_{aprx}$ corresponding to the identified highest order with reference to the polynomial table 17.

Referring to FIG. 13 and FIG. 14, the operation circuits, that is, the approximation operation circuit 14_1, the multiplication operation circuit 14_2, and the addition operation circuit 14_3, may perform a plurality of operations according to the operation scenario OP_SNR. The history management circuit 14_4 may tag history information to the cipher text CT received from the encryption circuit 13. Thereafter, the multiplication operation circuit 14_2 may output the first cipher text CT1 by performing a multiplication operation on the cipher text CT, and the history management circuit 14_4 may update the history information tagged to the first cipher text CT1. Particularly, the number of multiplication operations may be increased by 1. The approximation operation circuit 14_1 may output the final cipher text CT' by performing an approximation operation on the second cipher text CT2, and the history management circuit 14_4 may update the history information tagged to the final cipher text CT'. Particularly, the history management circuit 14_4 may update the history information so that the history information includes the number of multiplication operations performed by an approximation operation and the approximate accuracy bits $P_{aprx}$ of the approximation operation.

The operation circuit 14 according to some example embodiments of the present disclosure may manage information about operations performed on a cipher text by tagging history information to the cipher text.

Figure 15:
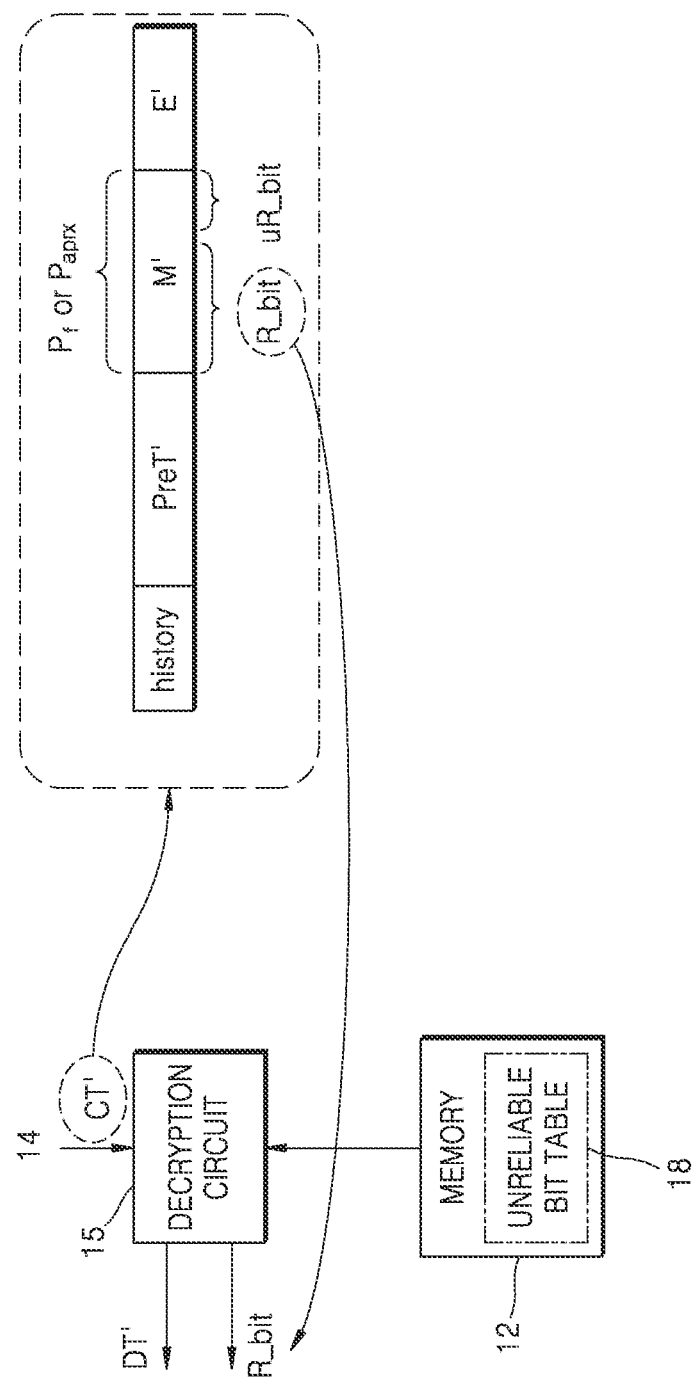
FIG. 15 illustrates a decryption circuit according to an example embodiment of the present disclosure.

FIG. 15 illustrates the decryption circuit 15 according to an example embodiment of the present disclosure. FIG. 16 illustrates an unreliable bit table 18 according to an example embodiment of the present disclosure.

Referring to FIG. 15, the decryption circuit 15 may receive the final cipher text CT' from the operation circuit 14. The decryption circuit 15 may output the decrypted data DT' by decrypting the final cipher text CT'. The decryption circuit 15 may output the number of reliable bits R_bit, which is determined based on history information tagged to the final cipher text CT'. The reliable bits R_bit in the final cipher text CT' may be the same as reliable bits in the decrypted data DT'.

A length of a message M' in the final cipher text CT' output from the operation circuit 14 may be predicted as the lower number of bits among the final valid bits $P_f$ and the approximate accuracy bits $P_{aprx}$. However, as the number of multiplication operations increases, unreliable bits uR_bit among the predicted bits may increase. Therefore, the decryption circuit 15 according to some example embodiments of the present disclosure may calculate the number of reliable bits R_bit by subtracting the number of unreliable bits uR_bit from the lower of the number of bits among the final valid bits $P_f$ and the approximate accuracy bits $P_{aprx}$. The decryption circuit 15 may provide a reliable section of the decrypted data DT' by outputting the number of reliable bits R_bit.

Referring to FIG. 15 and FIG. 16, the decryption circuit 15 may identify the number of unreliable bits uR_bit corresponding to the number of multiplication operations performed on the final cipher text CT', with reference to the unreliable bit table 18. The unreliable bit table 18 may indicate a relationship between the number of multiplication operations and the number of unreliable bits uR_bit. As the number of multiplication operations increases, the number of unreliable bits uR_bit may increase.

The decryption circuit 15 according to some example embodiments of the present disclosure may provide the reliable section of the decrypted data DT' by outputting the number of reliable bits R_bit, which is calculated by considering not only the decrypted plain text DT' but also an operation history.

Figure 17:
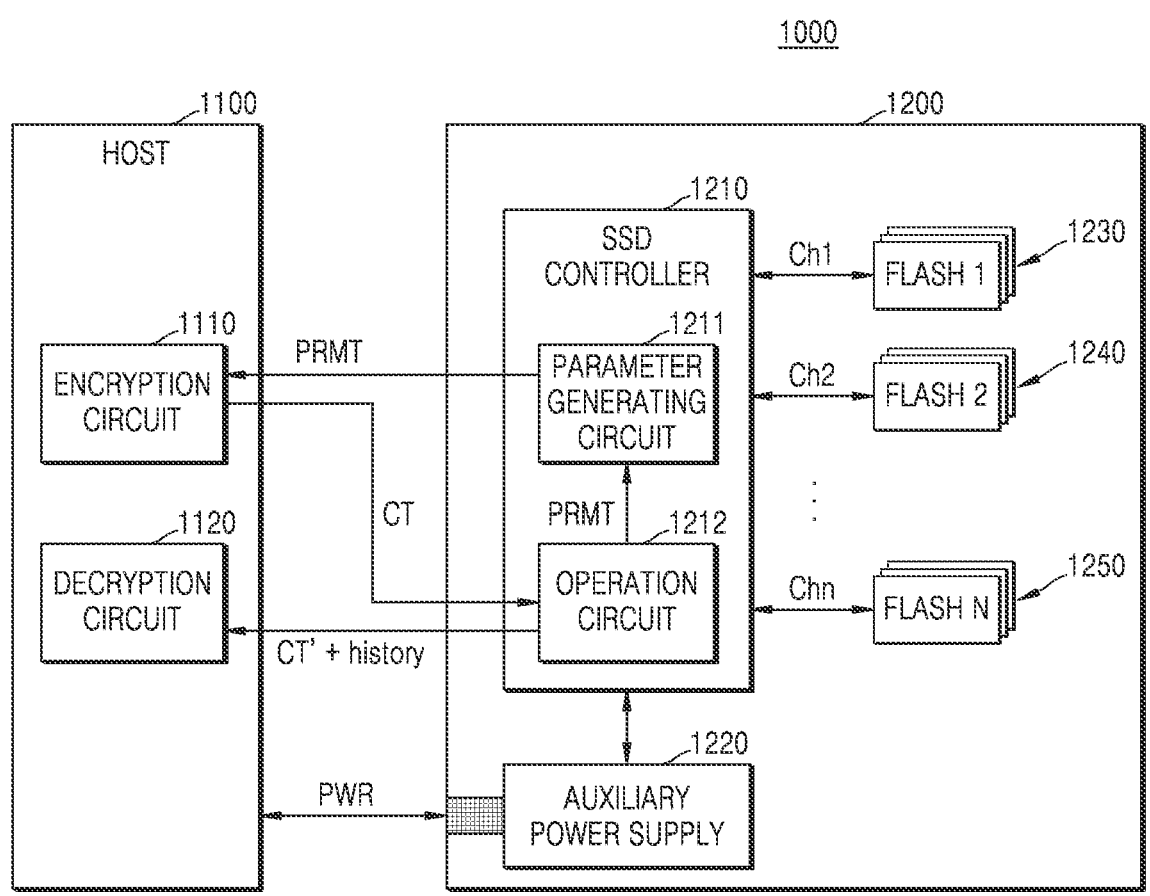
FIG. 17 illustrates a block diagram of a solid state drive (SSD) system according to an example embodiment of the present disclosure.

FIG. 17 illustrates a block diagram of a SSD system 1000 (solid state drive (SSD) system) according to an example embodiment of the present disclosure.

Referring to FIG. 17, the SSD system 1000 may include a host 1100 and an SSD 1200. The SSD 1200 may transmit signals to and receive signals from the host 1100 through a signal connector and receive power PWR from the host 1100 through a power connector. The SSD 1200 may transmit and receive signals corresponding to the encryption parameter PRMT, the initial cipher text CT, the final cipher text CT', and history information to and from the host 1100 through the signal connector The SSD 1200 may include an SSD controller 1210, an auxiliary power supply 1220, and a plurality of flash memory devices 1230, 1240, and 1250. The SSD controller 1210 may include a parameter generating circuit 1211 and an operation circuit 1212. The parameter generating circuit 1211 may generate the encryption parameter PRMT based on an operation scenario and transmit the generated encryption parameter PRMT to the host 1100. The operation circuit 1212 may receive, from the host 1100, the initial cipher text CT generated based on the encryption parameter PRMT and perform an operation on the initial cipher text CT. The operation circuit 1212 may provide the final cipher text CT' as the operation result and history information to the host 1100. The parameter generating circuit 1211 and the operation circuit 1212 may be implemented by using the embodiments illustrated in FIGS. 1 to 16.

The SSD controller 1210 may also be implemented using one or more combinations of processor(s) and memories dedicated to the processor(s). For example, a memory/combination based on the memory 40 and the processor 20 shown in FIG. 1 may be used to implement an SSD controller 1210, and the processor may execute instructions stored in the memory to implement aspects of functionality attributed to the parameter generating circuit 1211 and the operation circuit 1212 herein.

The host 1100 may include an encryption circuit 1110 and a decryption circuit 1120. The encryption circuit 1110 may generate the initial cipher text CT by encrypting a plain text based on the encryption parameter PRMT received from the SSD 1200. The encryption circuit 1110 may transmit the initial cipher text CT to the SSD 1200. The decryption circuit 1120 may receive the final cipher text CT' and the history information from the SSD 1200. The decryption circuit 1120 may decrypt the final cipher text CT' based on the history information. The encryption circuit 1110 and the decryption circuit 1120 may be implemented by using the embodiments illustrated in FIGS. 1 to 16.

While the inventive concept(s) described herein have been particularly shown and described with reference to embodiments thereof, it will be understood that various changes in form and details may be made therein without departing from the spirit and scope of the following claims.

What is claimed is:

1. An encryption device, comprising:
a parameter generating circuit configured to generate an encryption parameter including a number of initial valid bits based on an operation scenario;
an encryption circuit configured to generate a cipher text by encrypting a plain text received from the outside, based on the encryption parameter;
an operation circuit configured to generate a final cipher text by performing a plurality of operations on the cipher text according to the operation scenario and to tag, to the final cipher text, history information of the operations performed on the final cipher text; and
a decryption circuit configured to generate a decrypted plain text by decrypting the final cipher text and to output a number of reliable bits of the decrypted plain text based on the history information.

2. The encryption device of claim 1, wherein the parameter generating circuit is further configured to determine the number of initial valid bits based on a number of multiplication operations included in the operation scenario and to generate the encryption parameter including the number of initial valid bits.

3. The encryption device of claim 2, wherein the encryption parameter includes a total length of the cipher text and a number of error bits included in the cipher text, and
the parameter generating circuit is further configured to determine the total length of the cipher text and the number of error bits based on a security level received from the outside.

4. The encryption device of claim 3, wherein the encryption parameter includes a number of removal bits to be removed from the cipher text after the plurality of operations are performed, and
the parameter generating circuit is further configured to determine, as the number of removal bits, a value obtained by dividing the total length of the cipher text by the number of multiplication operations.

5. The encryption device of claim 4, wherein the parameter generating circuit is further configured to determine, as the number of initial valid bits, a difference between the number of removal bits and the number of error bits.

6. The encryption device of claim 5, wherein the operation circuit is further configured to perform, on the cipher text, an approximation operation included in the operation scenario, and the parameter generating circuit is further configured to compare a number of approximate accuracy bits of the cipher text according to the approximation operation to a number of final valid bits of the cipher text, which is expected when a multiplication operation is performed, and to determine the number of initial valid bits of the cipher text according to a result of comparing the number of approximate accuracy bits of the cipher text to the number of final valid bits of the cipher text.

7. The encryption device of claim 6, wherein the parameter generating circuit is further configured to determine the number of initial valid bits so that the number of approximate accuracy bits is identical to the number of final valid bits, when the number of approximate accuracy bits is different from the number of final valid bits.

8. The encryption device of claim 6, wherein the operation circuit is further configured to change the approximate accuracy bits by determining a highest order of an approximating polynomial to be used for the approximation operation so that the number of approximate accuracy bits is identical to the number of final valid bits, when the number of approximate accuracy bits is different from the number of final valid bits.

9. The encryption device of claim 7, wherein the operation circuit is further configured to tag, to the cipher text, history information of operations performed on the cipher text while the plurality of operations included in the operation scenario are performed on the cipher text.

10. An operating method of an encryption device, the method comprising:
generating an encryption parameter including a number of initial valid bits based on an operation scenario of a homomorphic operation;
generating a cipher text by encrypting a plain text received from the outside, based on the encryption parameter;
generating a final cipher text by performing a plurality of homomorphic operations on initial cipher text according to the operation scenario; and
outputting a decrypted plain text by decrypting the final cipher text,
wherein the initial valid bits are valid bits included in the cipher text before the plurality of homomorphic operations are performed, and
wherein the operation scenario includes the plurality of homomorphic operations to be performed on the cipher text.

11. The method of claim 10, wherein the generating of the encryption parameter comprises:
counting a number of multiplication operations included in the operation scenario; and
determining the number of initial valid bits based on the number of multiplication operations counted in the operation scenario.

12. The method of claim 10, wherein the generating of the encryption parameter comprises:
obtaining a number of approximate accuracy bits by an approximation operation included in the operation scenario;
comparing the number of approximate accuracy bits of the cipher text to a number of final valid bits of the cipher text, which is expected when a multiplication operation included in the operation scenario is performed; and
determining the number of initial valid bits according to a result of comparing the number of approximate accuracy bits of the cipher text to the number of final valid bits of the cipher text.

13. The method of claim 12, wherein the determining of the number of initial valid bits comprises
determining the number of initial valid bits so that the number of approximate accuracy bits is identical to the number of final valid bits, based on a result of comparing the number of approximate accuracy bits to the number of final valid bits which indicates that the number of approximate accuracy bits is different from the number of final valid bits.

14. The method of claim 12, wherein the generating of the final cipher text comprises determining a highest order of an approximating polynomial to be used for the approximation operation so that the number of approximate accuracy bits is identical to the number of final valid bits, based on a result of comparing the number of approximate accuracy bits to the number of final valid bits which indicates that the number of approximate accuracy bits is different from the number of final valid bits.

15. The method of claim 10, further comprising tagging, to the cipher text, history information of operations performed on the cipher text while the plurality of homomorphic operations included in the operation scenario are performed on the cipher text.

16. The method of claim 15, further comprising:
identifying a number of reliable bits in the decrypted plain text based on the history information of operations; and
and outputting the number of reliable bits identified in the identifying,
wherein the history information of operations includes a number of multiplication operations performed on the cipher text or approximate accuracy bits of an approximation operation performed on the cipher text.

17. A storage controller, comprising:
a parameter generating circuit configured to generate an encryption parameter including a number of initial valid bits based on an operation scenario of a homomorphic operation and output the encryption parameter to a host; and
an operation circuit configured to receive, from the host, a cipher text encrypted according to the encryption parameter, generate a final cipher text by performing at least one homomorphic operation on the cipher text according to the operation scenario, and output the final cipher text to the host,
wherein the initial valid bits are valid bits included in the cipher text before the at least one homomorphic operation is or are performed, and
wherein the operation scenario includes the at least one homomorphic operation to be performed on the cipher text.

18. The storage controller of claim 17, wherein the parameter generating circuit is further configured to determine the number of initial valid bits based on a number of multiplication operations included in the operation scenario.

19. The storage controller of claim 17, wherein the parameter generating circuit is further configured to compare a number of approximate accuracy bits of the cipher text according to an approximation operation included in the operation scenario and a number of final valid bits of the cipher text, which is expected when a multiplication operation included in the operation scenario is performed, and determine the number of initial valid bits of the cipher text according to a result of comparing the number of approximate accuracy bits of the cipher text to the number of final valid bits of the cipher text.

20. The storage controller of claim 17, wherein the operation circuit is further configured to tag, to the cipher text, history information of operations performed on the cipher text while the at least one homomorphic operation included in the operation scenario is or are performed on the cipher text.

* * * * *